US012514594B2

(12) United States Patent
Flatt

(10) Patent No.: US 12,514,594 B2
(45) Date of Patent: Jan. 6, 2026

(54) SURGICAL ATTACHMENTS FOR A SURGICAL HANDPIECE SYSTEM

(71) Applicant: Stryker Corporation, Kalamazoo, MI (US)

(72) Inventor: James E. Flatt, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 335 days.

(21) Appl. No.: 18/141,070

(22) Filed: Apr. 28, 2023

(65) Prior Publication Data
US 2023/0397916 A1     Dec. 14, 2023

Related U.S. Application Data

(60) Provisional application No. 63/351,808, filed on Jun. 13, 2022.

(51) Int. Cl.
*A61B 17/16*     (2006.01)

(52) U.S. Cl.
CPC ...... *A61B 17/1617* (2013.01); *A61B 17/1628* (2013.01)

(58) Field of Classification Search
CPC . A61B 17/16; A61B 17/1613; A61B 17/1615; A61B 17/1617; A61B 17/162; A61B 17/1622; A61B 17/1624; A61B 17/1626; A61B 17/1628; B23B 31/02; B23B 31/10; B23B 31/107; B23B 31/1071
See application file for complete search history.

(56) References Cited

U.S. PATENT DOCUMENTS

| 5,507,211 | A | | 4/1996 | Wagner | |
|---|---|---|---|---|---|
| 5,823,774 | A | * | 10/1998 | Abbott | A61C 1/08 433/116 |
| 5,993,454 | A | * | 11/1999 | Longo | B23Q 5/048 606/85 |

(Continued)

FOREIGN PATENT DOCUMENTS

| WO | WO-2016022317 A1 * | 2/2016 | ......... A61B 17/1622 |
|---|---|---|---|
| WO | WO-2019035096 A1 * | 2/2019 | ......... A61B 17/1631 |

OTHER PUBLICATIONS

Depuy Synthes, "Colibri II System Brochure", 2020, 3 pages.

(Continued)

*Primary Examiner* — Eric S Gibson
(74) *Attorney, Agent, or Firm* — Howard & Howard Attorneys PLLC

(57) ABSTRACT

A Surgical attachment for a surgical handpiece. The surgical attachment includes a housing for coupling to the surgical handpiece. A driving member is disposed within the housing. The driving member is rotatable about an axis and transfers torque from the handpiece to a surgical accessory tool. The driving member has a drive portion with shoulders that define a bore. Flats extend from the shoulders to engage corresponding flats of the surgical accessory tool. A lock assembly is coupled to the driving member. The lock assembly includes a retainer positioned behind the shoulders of the drive portion of the driving member. The retainer is biased into the bore to engage the surgical accessory tool. The retainer may be permitted to move outwardly from the axis to allow decoupling of the surgical accessory tool in response to sliding of a collar in an axial direction relative to the driving member.

20 Claims, 14 Drawing Sheets

(56) References Cited

U.S. PATENT DOCUMENTS

| | | | |
|---|---|---|---|
| 6,358,152 B2 | 3/2002 | Casutt | |
| 7,331,963 B2 | 2/2008 | Bryan et al. | |
| 7,740,249 B1* | 6/2010 | Gao | B23B 31/1071 |
| | | | 279/22 |
| 8,021,365 B2 | 9/2011 | Phan | |
| 8,366,122 B2* | 2/2013 | Lee | B23B 31/107 |
| | | | 279/74 |
| 8,786,233 B2 | 7/2014 | Fair et al. | |
| 8,801,713 B2* | 8/2014 | del Rio | A61B 17/1617 |
| | | | 279/78 |
| 8,939,979 B2* | 1/2015 | Del Rio | A61B 17/1637 |
| | | | 606/80 |
| 9,101,369 B2 | 8/2015 | Ries | |
| 9,113,917 B2 | 8/2015 | del Rio et al. | |
| 9,381,023 B2 | 7/2016 | del Rio et al. | |
| 9,414,848 B2* | 8/2016 | Edwards | A61B 17/162 |
| 9,504,478 B2 | 11/2016 | Edwards et al. | |
| 9,681,879 B2 | 6/2017 | del Rio et al. | |
| 10,080,579 B2 | 9/2018 | Cihak et al. | |
| 10,194,921 B2 | 2/2019 | del Rio et al. | |
| 10,278,712 B2 | 5/2019 | Edwards et al. | |
| 10,987,112 B2 | 4/2021 | del Rio et al. | |
| 11,000,294 B2* | 5/2021 | Bürk | A61B 17/32002 |
| 11,076,871 B2 | 8/2021 | Barnes | |
| 11,819,221 B2* | 11/2023 | Burke | A61B 17/1615 |
| 2002/0151902 A1* | 10/2002 | Riedel | A61B 17/162 |
| | | | 606/80 |
| 2006/0053974 A1* | 3/2006 | Blust | B23B 31/008 |
| | | | 81/3.07 |
| 2009/0261536 A1* | 10/2009 | Beale | B23B 31/1071 |
| | | | 279/19.7 |
| 2010/0286694 A1* | 11/2010 | Rio | A61B 17/1631 |
| | | | 606/80 |
| 2011/0082029 A1 | 4/2011 | Thorsteinson et al. | |
| 2012/0253323 A1* | 10/2012 | Bharadwaj | A61B 17/8883 |
| | | | 606/1 |
| 2012/0259337 A1* | 10/2012 | del Rio | A61B 17/1617 |
| | | | 29/428 |
| 2015/0032111 A1 | 1/2015 | del Rio et al. | |
| 2015/0313610 A1 | 11/2015 | Edwards et al. | |
| 2015/0313612 A1 | 11/2015 | Edwards et al. | |
| 2015/0359543 A1 | 12/2015 | del Rio et al. | |
| 2016/0171232 A1 | 6/2016 | Shoemaker et al. | |
| 2016/0270799 A1 | 9/2016 | del Rio et al. | |
| 2016/0362320 A1 | 12/2016 | Potts | |
| 2017/0071608 A1 | 3/2017 | Edwards et al. | |
| 2017/0143350 A1* | 5/2017 | Burke | A61B 17/1631 |
| 2017/0281196 A1 | 10/2017 | del Rio et al. | |
| 2019/0239900 A1 | 8/2019 | del Rio et al. | |
| 2019/0266769 A1 | 8/2019 | Yeon et al. | |
| 2021/0106350 A1 | 4/2021 | Cihak et al. | |
| 2021/0244423 A1 | 8/2021 | del Rio et al. | |
| 2022/0211391 A1* | 7/2022 | Carusillo | A61B 17/1622 |
| 2022/0339712 A1* | 10/2022 | Lin | B23B 31/1071 |
| 2023/0023681 A1* | 1/2023 | Xu | B25B 21/02 |
| 2023/0397916 A1* | 12/2023 | Flatt | A61B 17/162 |
| 2024/0246156 A1* | 7/2024 | Fischer | B23B 31/1071 |

OTHER PUBLICATIONS

Medtronic, "CD Horizon Solera 5.5/6.0 Spinal System Surgical Technique", 2014, 72 pages.

Zimmer Biomet, "Vitality + Power Instrument Kit Surgical Technique", 2018, 18 pages.

* cited by examiner

SURGICAL ATTACHMENTS FOR A SURGICAL HANDPIECE SYSTEM

CROSS-REFERENCE TO RELATED APPLICATIONS

This application claims priority to and all the benefits of U.S. Provisional Patent Application Nos. 63/351,808, filed on Jun. 13, 2022, the entire contents of each being hereby incorporated by reference.

BACKGROUND

Conventional medical and surgical procedures routinely involve the use of surgical tools and instruments which allow surgeons to approach and manipulate surgical sites. By way of non-limiting example, rotary instruments such as handheld drills are commonly utilized in connection with orthopedic procedures to address various musculoskeletal conditions, such as trauma, sports injuries, degenerative diseases, joint reconstruction, and the like. In procedures where handheld drills or similar surgical instruments are employed, rotational torque selectively generated by an actuator (e.g., an electric motor) is used to rotate drive shafts of a releasably-attachable surgical attachments at different speeds.

While handheld surgical instruments are routinely utilized to assist in the performance of a variety of different types of medical and/or surgical procedures, there is a need in the art to continuously improve such handheld surgical instruments.

BRIEF DESCRIPTION OF THE DRAWINGS

Advantages of the present invention will be readily appreciated as the same becomes better understood by reference to the following detailed description when considered in connection with the accompanying drawings wherein.

SUMMARY

Figure 1:
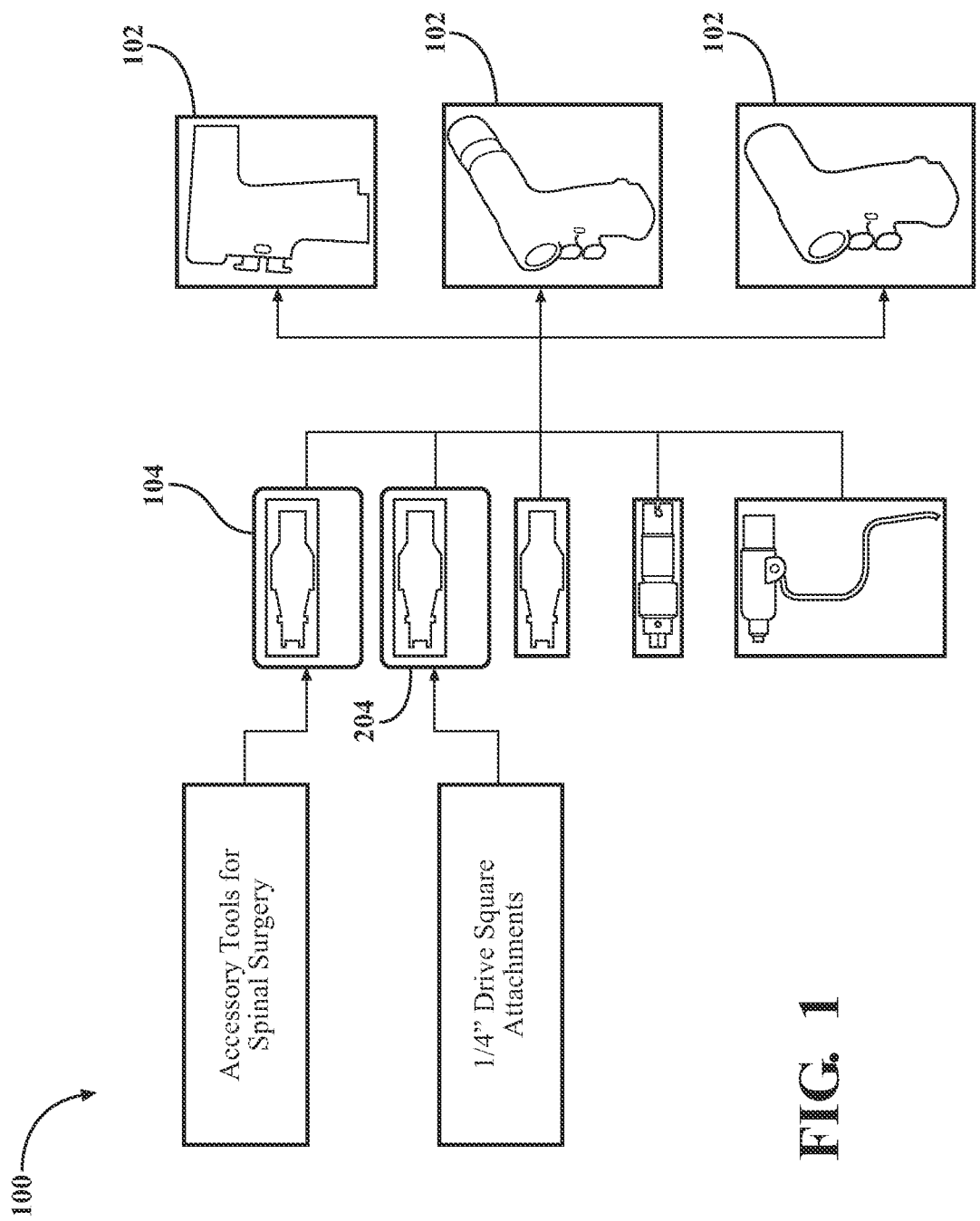
FIG. 1 is a perspective view of a surgical handpiece system.
Figure 2:
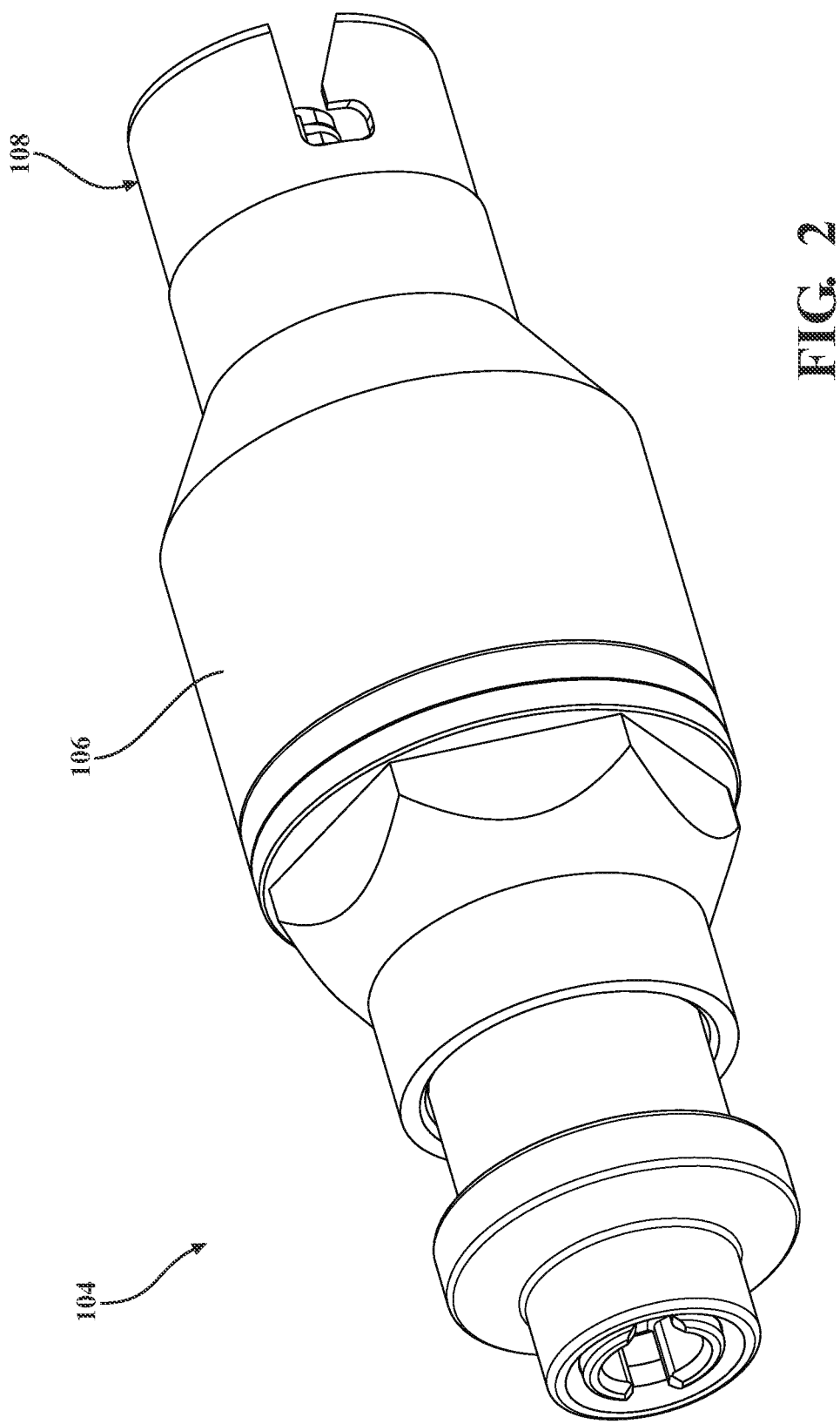
FIG. 2 is a perspective view of a first configuration of the surgical attachment.
Figure 3:
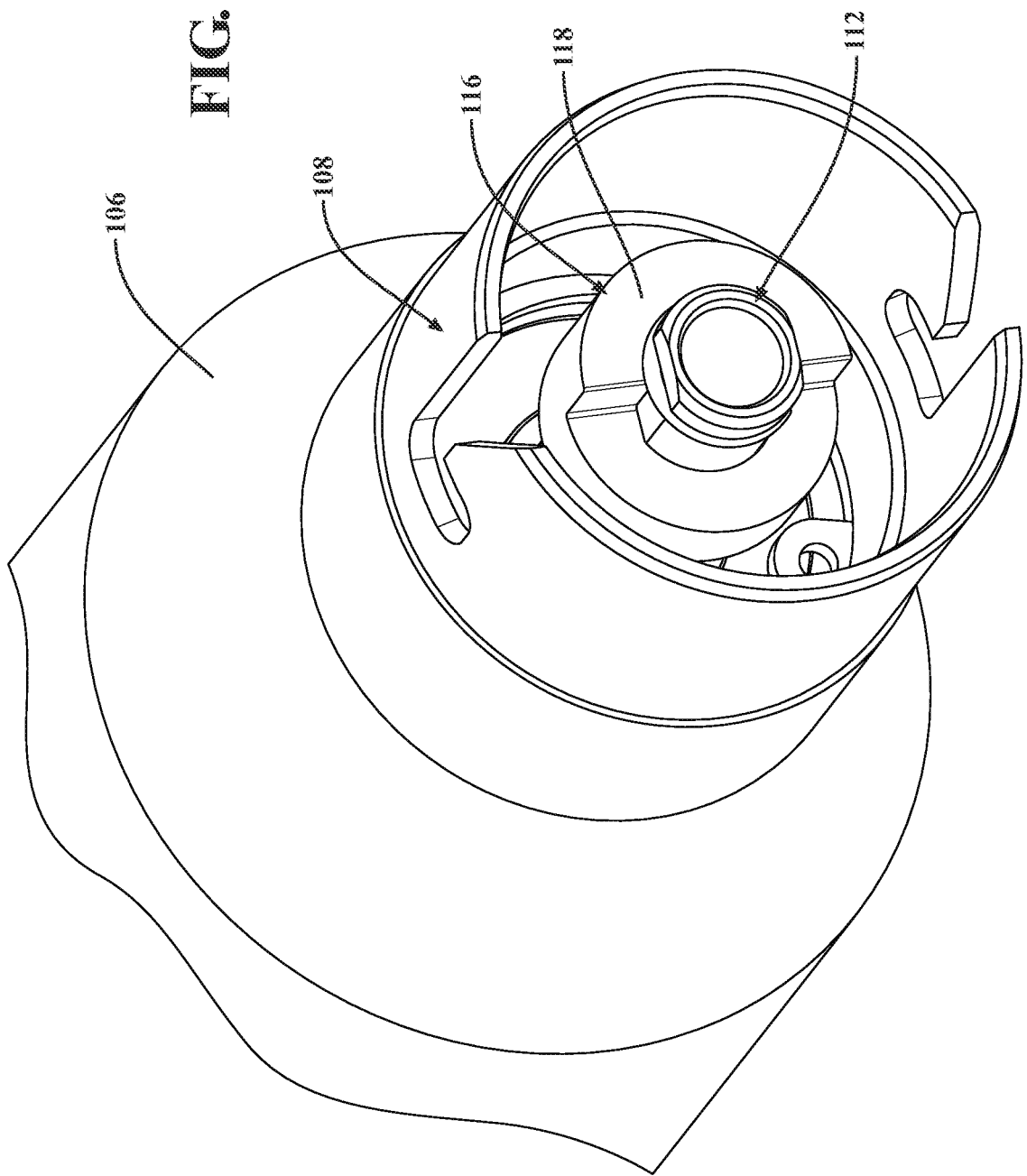
FIG. 3 is a perspective view of a proximal end of the surgical attachment of FIG. 2.
Figure 4:
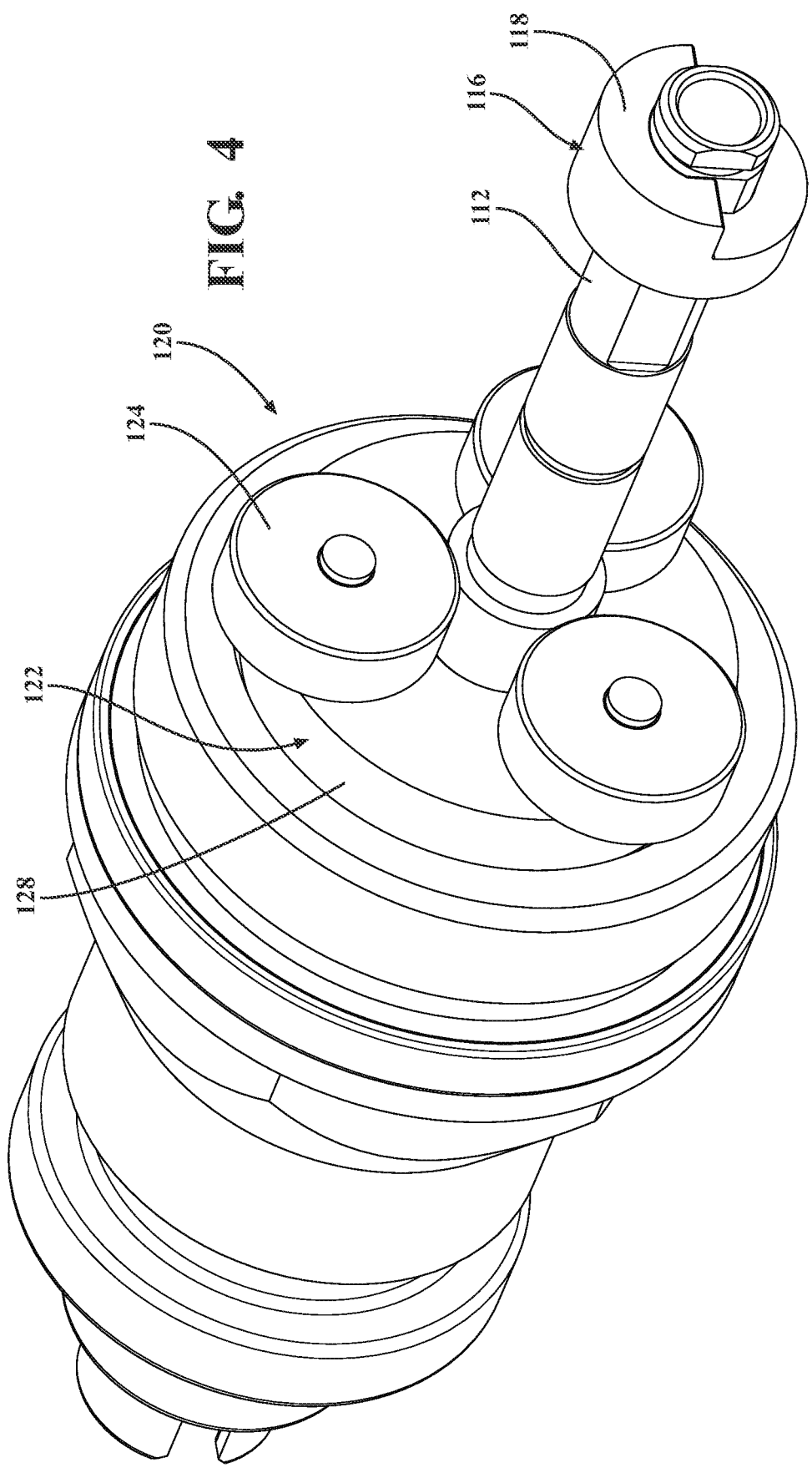
FIG. 4 is a perspective view of a planetary gear assembly of the surgical attachment of FIG. 2.
Figure 5:
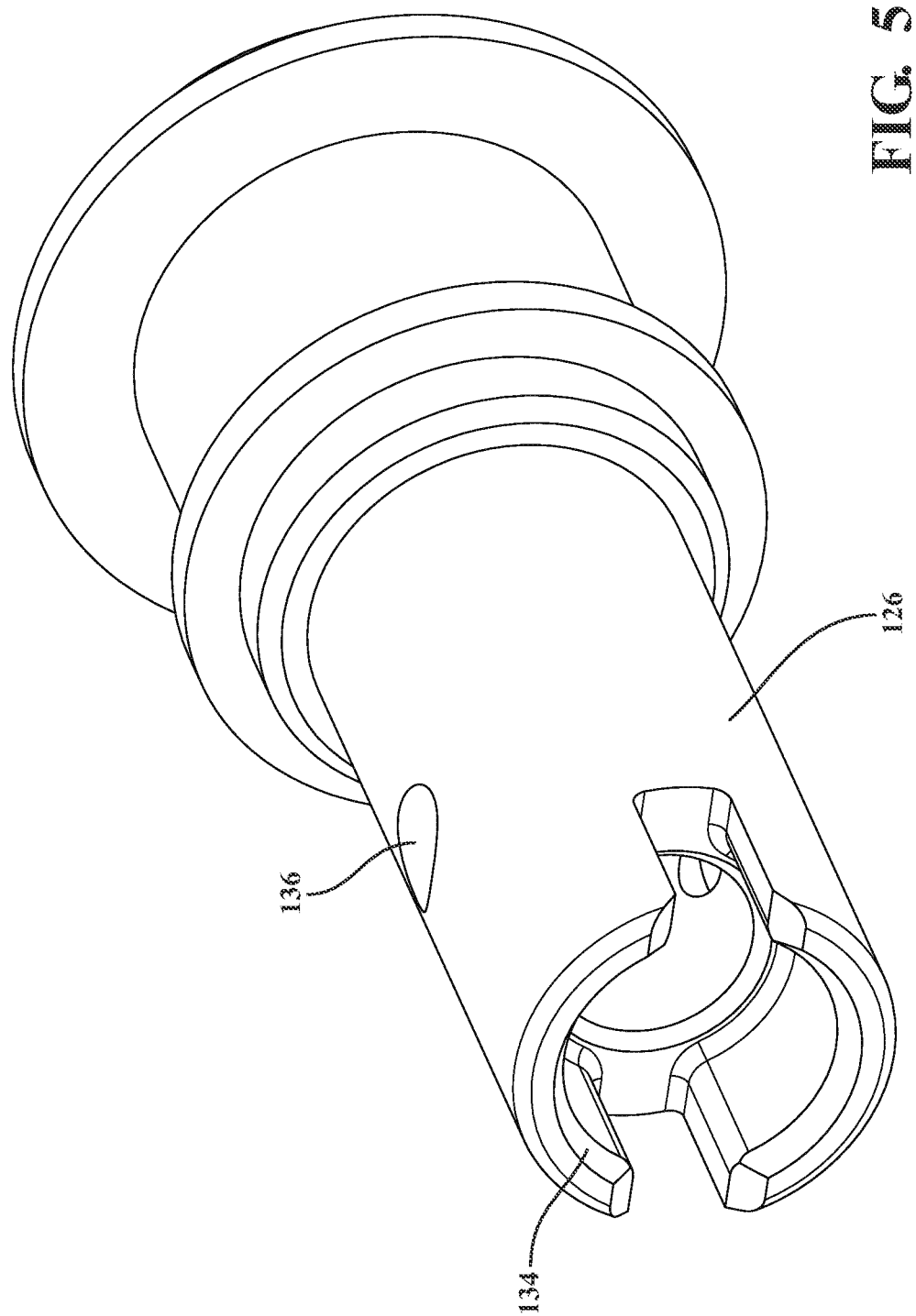
FIG. 5 is a perspective view of a distal portion of an output drive shaft of the surgical attachment of FIG. 2.
Figure 6:
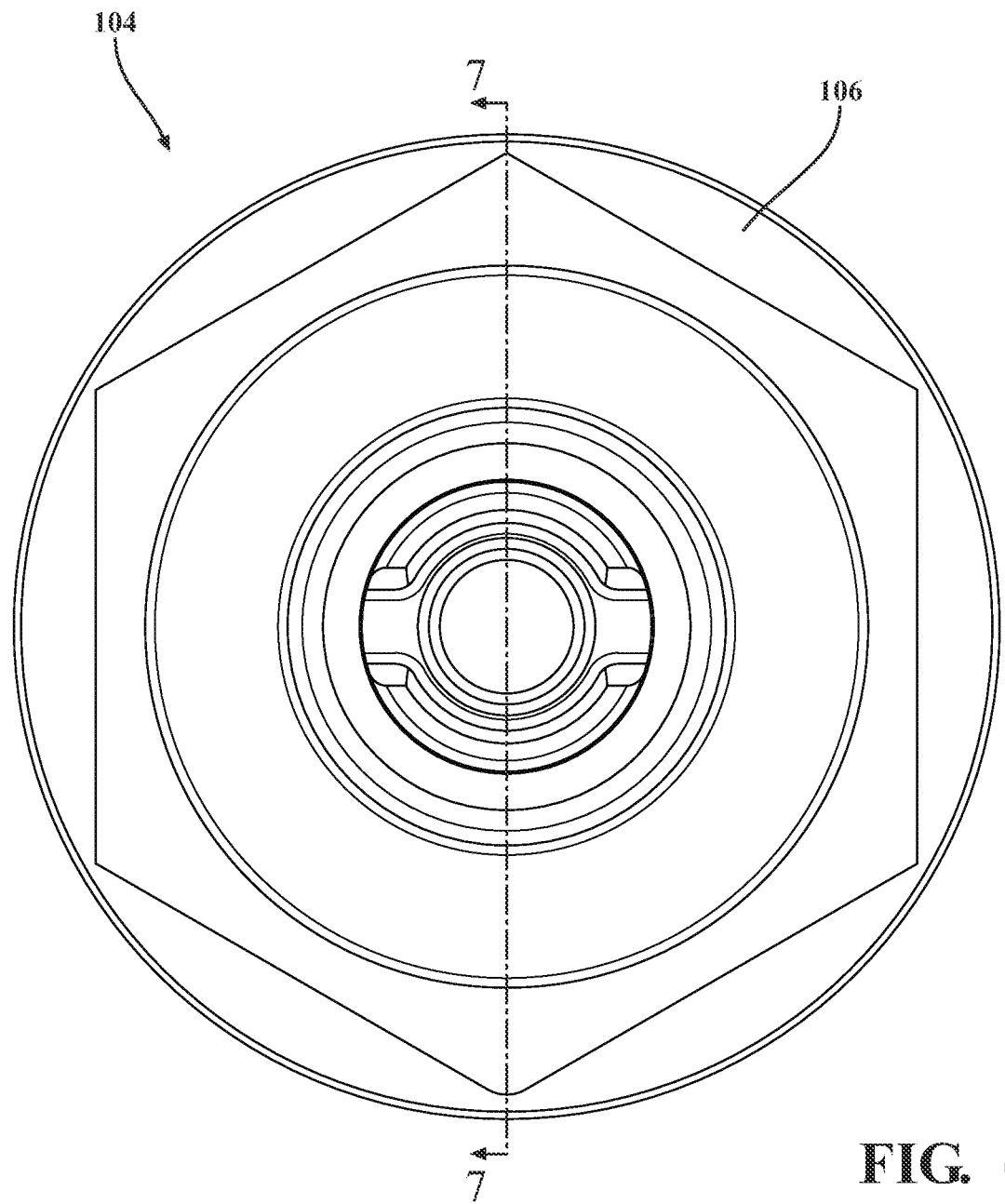
FIG. 6 is an elevation view of the distal end of the surgical attachment of FIG. 2.
Figure 7:
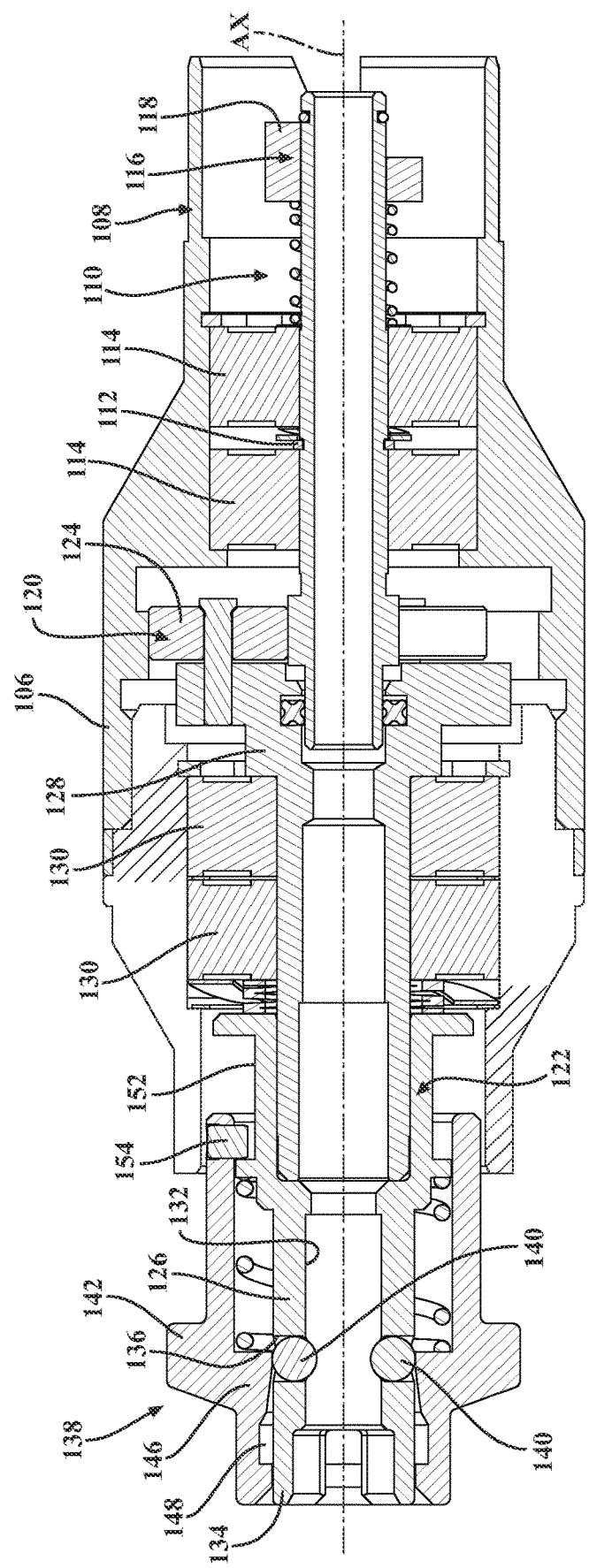
FIG. 7 is section view of the surgical attachment along lines 7-7 of FIG. 6.
Figure 8:
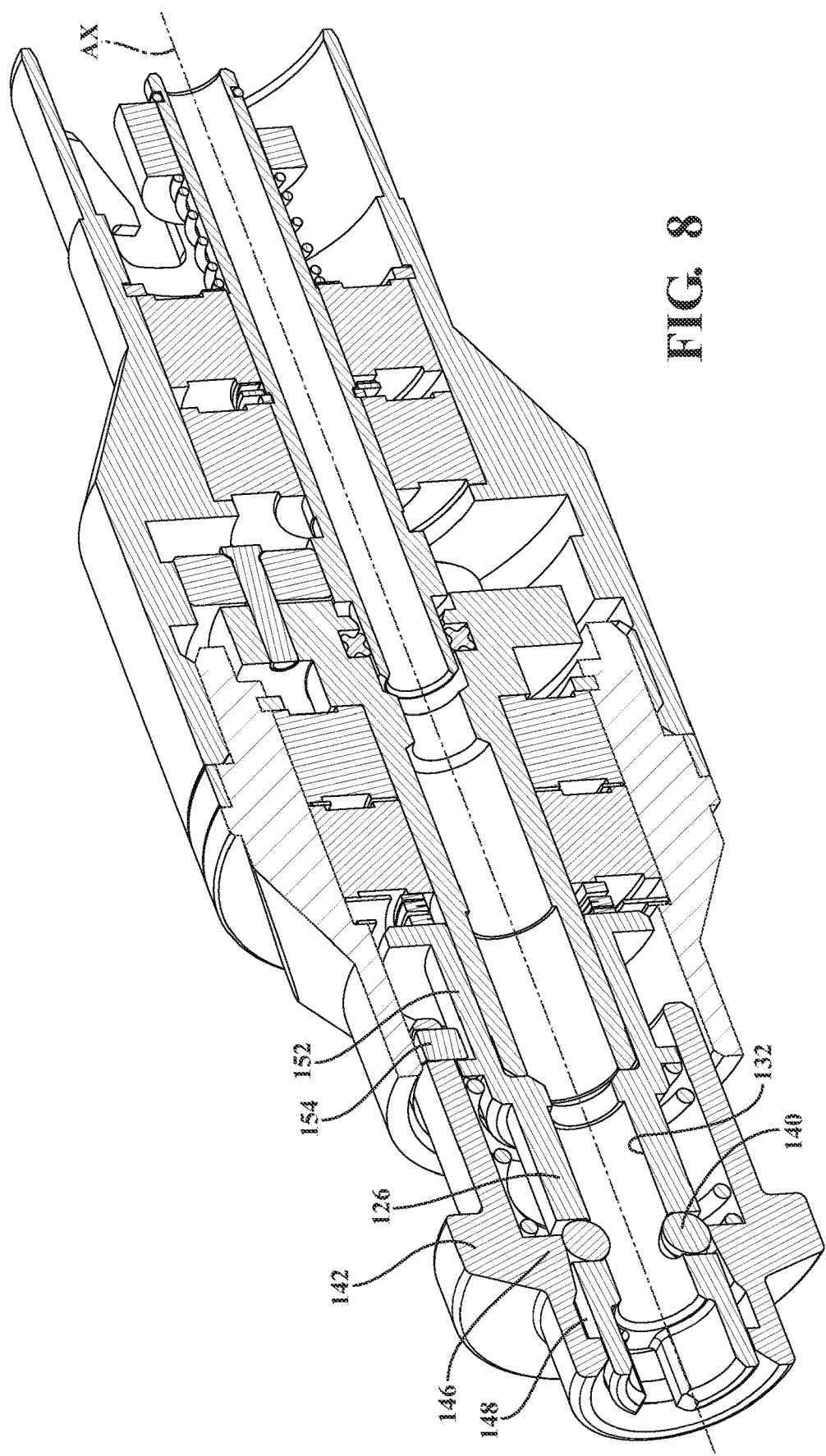
FIG. 8 is a perspective view of the surgical attachment of FIG. 7 with a collar in an engaged position.

A surgical attachment for coupling to a surgical driver and a surgical accessory tool according to a first aspect is disclosed. The surgical attachment comprises a housing having a first end portion for coupling to the surgical driver and a second end portion opposite the first end portion. A driving member is at least partially disposed within the housing. The driving member is rotatable about an axis relative to the housing. The driving member is configured to transfer torque received from the surgical driver to the surgical accessory tool. The driving member comprises a drive portion having a plurality of shoulders defining a bore at a distal end of the drive portion. The drive portion also has a plurality of flats further defining the bore and extending proximally from each of the plurality of shoulders for engaging corresponding flats of the surgical accessory tool. A lock assembly is coupled to the driving member. The locking assembly comprises a retainer positioned proximal the plurality of shoulders of the drive portion of the driving member. The retainer is moveable in a direction perpendicular to the axis. A collar is slidably coupled to the driving member and moveable relative to the driving member from a first position to a second position. The retainer is in an engaged position in which the retainer is disposed at a first distance from the axis when the collar is in the first position for coupling the surgical accessory tool to the driving member. The retainer is permitted to move to a released position in which the retainer is disposed at a second distance from the axis greater than the first distance when the collar is in the second position for decoupling the surgical accessory tool from the driving member.

A surgical handpiece system for coupling to a surgical accessory tool according to a second aspect is also disclosed. The surgical handpiece system comprises a surgical handpiece including a motor for generating torque. The surgical handpiece system also includes a surgical attachment for coupling to the surgical handpiece. The surgical attachment comprises a housing having a first end portion for coupling to the surgical driver and a second end portion opposite the first end portion. A driving member is at least partially disposed within the housing. The driving member is rotatable about an axis relative to the housing. The driving member is configured to transfer torque received from the surgical driver to the surgical accessory tool. The driving member comprises a drive portion having a plurality of shoulders defining a bore at a distal end of the drive portion. The drive portion also has a plurality of flats further defining the bore and extending proximally from each of the plurality of shoulders for engaging corresponding flats of the surgical accessory tool. A lock assembly is coupled to the driving member. The locking assembly comprises a retainer positioned proximal the plurality of shoulders of the drive portion of the driving member. The retainer is moveable in a direction perpendicular to the axis. A collar is slidably coupled to the driving member and moveable relative to the driving member from a first position to a second position. The retainer is in an engaged position in which the retainer is disposed at a first distance from the axis when the collar is in the first position for coupling the surgical accessory tool to the driving member. The retainer is permitted to move to a released position in which the retainer is disposed at a second distance from the axis greater than the first distance when the collar is in the second position for decoupling the surgical accessory tool from the driving member.

DETAILED DESCRIPTION

Referring now to the figures, wherein like numerals indicate corresponding parts throughout the several views, a surgical handpiece system 100 is shown in FIG. 1. The system 100 includes a surgical handpiece assembly 102 that is realized as a handheld drill with a pistol-grip shaped handpiece housing which may be releasably attached to a battery (not shown). The surgical handpiece assembly 102 may alternatively be referred to as a surgical driver. However, it is contemplated that the handpiece housing can have any suitable shape with or without a pistol grip. While the illustrated surgical handpiece assembly 102 employs a battery which is releasably attachable to the handpiece housing to provide power to the surgical handpiece assembly 102 and utilized to power a motor (not shown) to selectively rotate a handpiece output shaft (not shown). A gear train may be disposed between the motor and the handpiece output shaft to transfer power developed by the motor to the handpiece output shaft. Other configurations of the handpiece assembly 102 are contemplated. One example of a suitable handpiece assembly 102 is the System 8 Cordless Driver, marketed by Stryker Corporation as Part No. 4505-000-000. Another example of a suitable handpiece assembly 102 is the System 9 Cordless Driver, marketed by Stryker Corporation as Part No. 4605-000-000. Another example of a suitable handpiece assembly 102 is disclosed in U.S. Pat. No. 5,993,454.

The system 100 also comprises a surgical attachment 104. One surgical attachment 104 is illustrated in FIGS. 1-10. The surgical attachment 104 may be used in connection with accessory tools for spinal surgical procedures in the drilling, reaming, and decorticating of bone and other bone-related tissue. It is also useable in the placement of pedicle screws. The accessory tool for spinal surgical procedures (e.g., a screwdriver to place the pedicle screws) may be removably coupled to the surgical attachment 104. Examples of suitable accessory tools include accessory tools sold in the Xia® and Serrato® systems. The surgical attachment 104 may be coupled to a distal end of the handpiece assembly 102. The surgical attachment 1047 comprises a housing 106 configured to be coupled to the handpiece assembly 102. The housing 106 may comprise a surgical attachment coupler 108 configured for removable coupling with the surgical handpiece assembly 102 to maintain the relative position and orientation of the surgical attachment 104 relative to the surgical handpiece assembly 102 when coupled. The surgical attachment coupler 108 may comprise a bayonet mount. However, it is contemplated that the surgical attachment coupler 108 may comprise other configurations to removably couple the surgical attachment 104 to the handpiece assembly 102.

The surgical attachment 104 may comprise a gear assembly 110 internal to the housing 106. The gear assembly 110 transfers the rotational power available at the handpiece output shaft to a lock assembly 138 (described in greater detail further below) mounted at a distal region of the surgical attachment 104. The gear assembly 110 may comprise an input drive shaft 112 extending along an axis AX and being rotatably mounted to the housing 106. One or more bearing assemblies 114 may rotatably couple the input drive shaft 112 to the housing 106. The input drive shaft 112 comprises a coupling portion 116 for coupling to the handpiece output shaft. The coupling portion 116 of the input drive shaft 112 may comprise a proximal protrusion 118 extending proximally and generally parallel to the axis AX. In one configuration, the proximal protrusion 118 operates as a drive dog/torque transmission geometry to transmit torque via interference coupling with a complementary drive dog/torque transmission geometry of the handpiece output shaft of the surgical handpiece assembly. Consequently, the rotation of handpiece output shaft causes a like rotation of the input drive shaft 112. The input drive shaft 112 is formed with a bore that extends axially through the input drive shaft 112.

The gear assembly 110 may further comprise a gear train 120 for increasing torque between the input drive shaft 112 and an output drive shaft 122 that rotates the lock assembly 138. The output drive shaft 122 may alternatively be referred to as a driving member. In the illustrated configurations, the gear train 120 comprises a planetary gear assembly 121 with the input drive shaft 112 comprising a sun gear and the output drive shaft 122 comprising a carrier for one or more planet gears 124. The sun gear engages the planet gears 124 that are rotatably mounted to the output drive shaft 122. More specifically, the planet gears 124 may be equiangularly spaced around the axis AX of input drive shaft 112. The housing 106 may comprise a ring gear (not illustrated) on an inner surface surrounding and disposed in meshed engagement with the planet gears 124 to cause the planet gears 124 to revolve about the axis AX in response to rotation of the input drive shaft 112 and the planet gears 124. The illustrated configuration of planet gear results in a 5:1 gear reduction between the input drive shaft 112 and the output drive shaft 122. It is contemplated that other planetary gear assemblies may be used to result in a different gear reduction. It is also contemplated that the gear assembly 110 may comprise a gear train 120 different from the planetary gear assembly to achieve gear reduction.

The output drive shaft 122 has a proximal portion 128 that extends distally away from the gear train 120 and a distal portion 126 extending distally away from the proximal portion 128. The proximal and distal portions 128, 126 of the output drive shaft 122 may be separate components fixed together by interference fitting, welding, an adhesive etc. In other configurations, the proximal and distal portions 128, 126 of the output drive shaft 122 collectively comprise a single monolithic component. One or more bearing assemblies 130 may extend between an inner wall of the housing 106 to rotatably mount the output drive shaft 122 in the housing 106. It will also be noted that, in the illustrated version of the invention, the distal portion 126 output drive shaft 122 has a bore 132 that extends axially through the output drive shaft 122. The bore of the input drive shaft 112 may be in communication with the bore 132 of the output drive shaft 122. The output drive shaft 122 comprises distal protrusions 134 extending distally and generally parallel to the axis AX. In one configuration, the distal protrusion 134 transmits torque via interference coupling with a complementary protrusion of the accessory tool.

The output drive shaft 122 defines a plurality of openings 136 through inner and outer surfaces of the distal portion 126 of the output drive shaft 122 that is configured to be coupled to the accessory tool. The openings 136 may be disposed about the axis AX such that the openings 136 surround the bore 132 of the distal portion 126 of the output drive shaft 122.

A lock assembly 138 is coupled to the distal portion 126 of the output drive shaft 122 to removably couple the accessory tools to the surgical attachment 104. The lock assembly 138 includes a plurality of retainers 140 that are configured to be at least partially disposed within the bore 132. In many configurations, one or more of the retainers 140 comprises a spherical body. It is contemplated that the retainers 140 may comprise other shapes capable of engaging a groove of the accessory tool to couple the accessory tool to the output drive shaft 122. Each retainer 140 is moveable within one of the openings 136 relative to the output drive shaft 122 in a direction perpendicular to the axis AX. In many configurations, each retainer 140 is moveable within one of the openings 136 relative to the output drive shaft 122 in a radial direction to the axis AX. One or more of the openings 136 may be sized to prevent movement of one or more of the retainers 140 to pass through the opening 136. In other words, one or more of the openings 136 may be sized large enough to permit a retainer 140 to extend radially inward beyond the inner surface of the output drive shaft 122, and small enough to prevent a retainer 140 from falling into the bore 132 through the opening 136.

Figure 9:
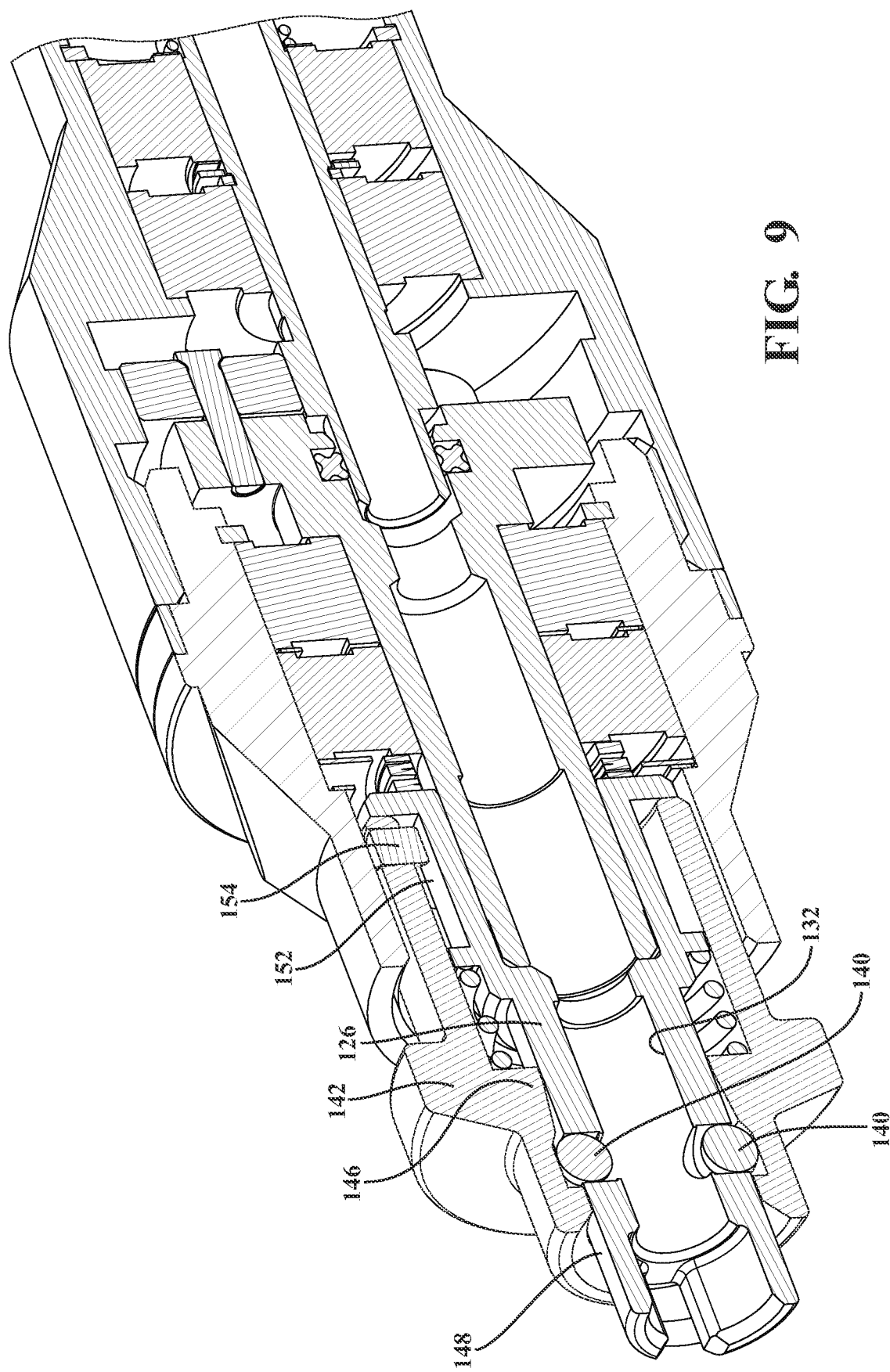
FIG. 9 is a perspective view of the surgical attachment of FIG. 7 with the collar in the disengaged position.
Figure 10:
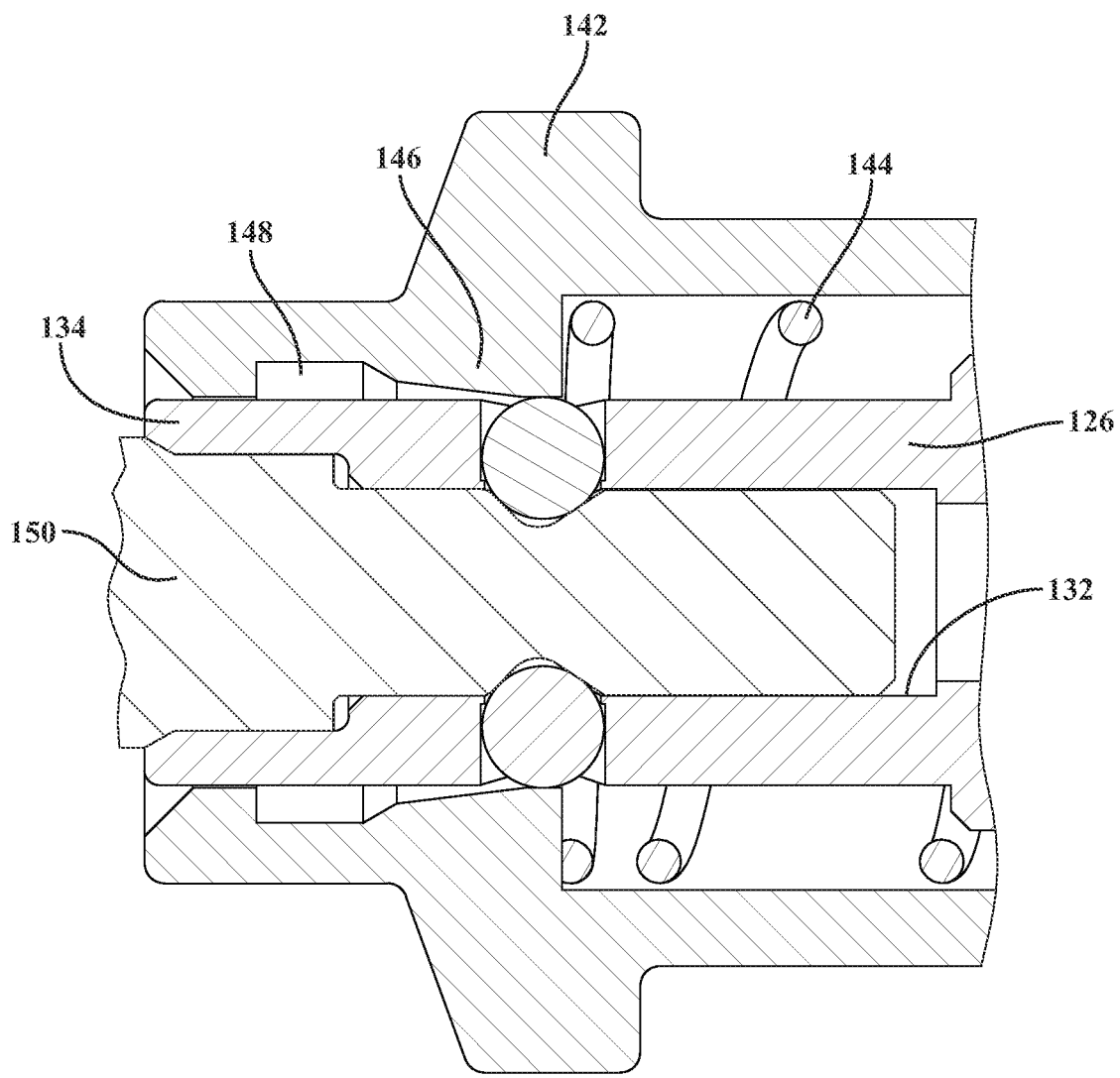
FIG. 10 is a sectional view of the surgical attachment of FIG. 2 with an accessory tool inserted in a bore of the output drive shaft.
Figure 11:
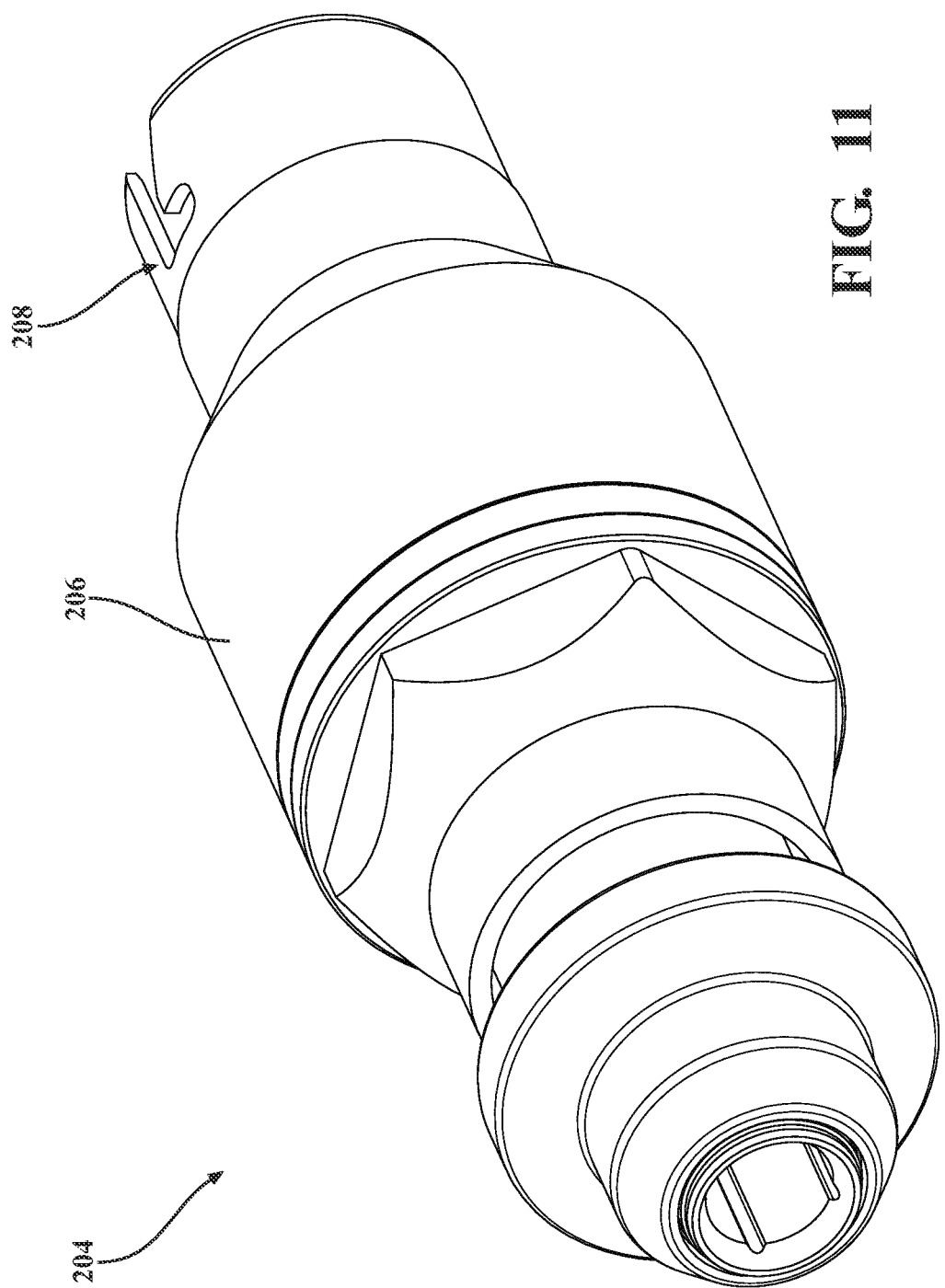
FIG. 11 is a perspective view of a second configuration of the surgical attachment.
Figure 12:
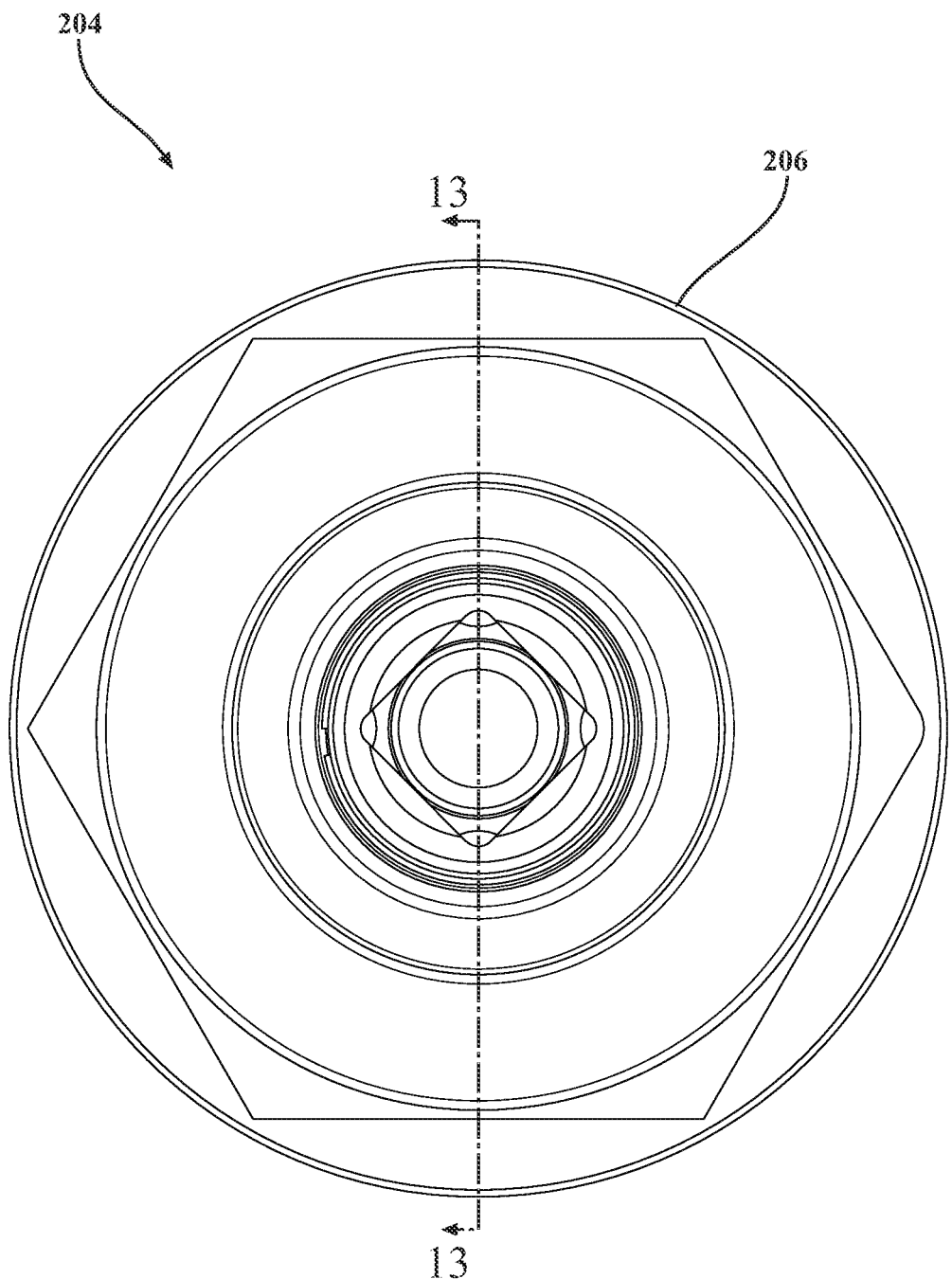
FIG. 12 is an elevation view of the distal end of the surgical attachment of FIG. 11.
Figure 13:
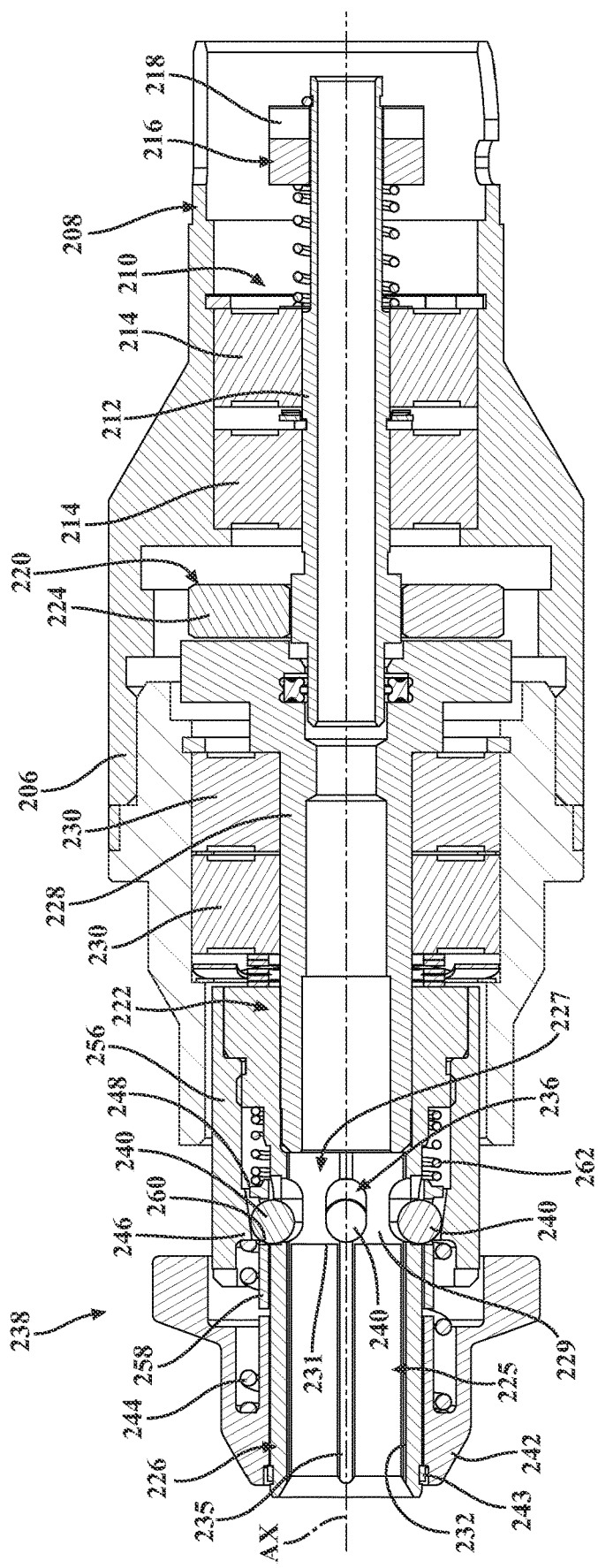
FIG. 13 is section view of the surgical attachment along lines 13-13 of FIG. 12.
Figure 14:
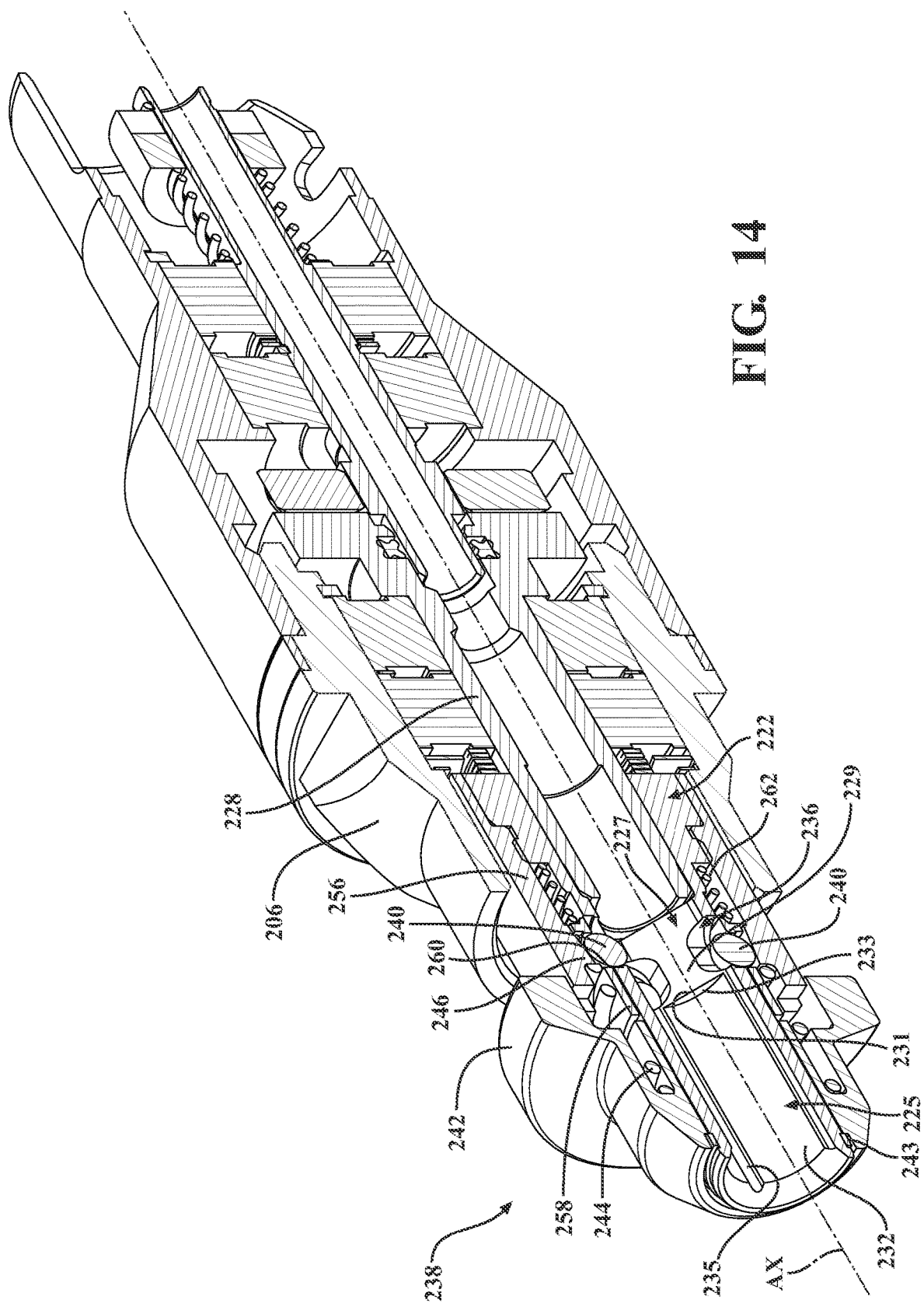
FIG. 14 is a perspective view of the surgical attachment of FIG. 13 with a collar in an engaged position.

The lock assembly 138 comprises a collar 142 slidably coupled to the output drive shaft 122. The collar 142 is moveable relative to the output drive shaft 122 to an engaged position (FIG. 8) and a disengaged position (FIG. 9). The collar 142 in the engaged position is more distal relative the output drive shaft 122 in the engaged position than in the disengaged position. The collar 142 may be biased distally to the engaged position by a spring 144 (FIG. 10). The collar 142 includes an annular projection 146 having an annular tapered surface and a recess 148 for receiving the retainer 140. In the engaged position, the projection 146 abuts the retainer 140 to urge the retainer 140 to project within the bore 132 of the distal portion 126 of the output drive shaft 122. When the accessory tool 150 is received within the bore 132 to an adequate depth for coupling, the retainer 140 projects into the bore 132 and is received by a groove of the accessory tool 150. In the disengaged position, the recess 148 is axially aligned with the retainer 140 to receive the retainer 140 and the accessory tool 150 may be inserted or removed without the retainer 140 preventing axial movement of the accessory tool 150. A user may apply force in opposition to the spring 144 to move the collar 142 to the disengaged position and permit axial movement of the accessory tool 150 within the bore 132.

The distal portion 126 of the output drive shaft 122 may define an annular recess 152 for receiving a pin 154 that is coupled to the collar 142. The axial length of the annular recess 152 limits the axial movement of the collar 142 relative to the output drive shaft 122 between the engaged and disengaged positions.

Another configuration of the surgical attachment 204 is illustrated in FIGS. 11-14. The surgical attachment 204 of the configuration illustrated in FIGS. 11-14 shares many of the same features as the configuration illustrated in FIGS. 1-10 except for the distal portion 226 of the output drive shaft 222 and the lock assembly 238.

The output drive shaft 222, alternatively referred to as a driving member, defines a bore 232. The output drive shaft 222 may include a guide portion 225 and a drive portion 227. The drive portion 227 may have a plurality of edges 231 that define a portion of the bore 232 at a distal end of the drive portion 227. The edges 231 may alternatively be referred to as shoulders. The drive portion 227 may have a plurality of flats 229 that further define the bore 232 and extend proximally from each of the plurality of shoulders 231 for engaging corresponding flats of the surgical accessory tool. In the configuration illustrated in FIGS. 13 and 14, the plurality of flats include four flats and are arranged in a square cross-section. In other configurations, any number of flats may be used to form another shape in cross-section to transmit torque via interference coupling with a corresponding accessory tool having complementary features to engage the flats.

The guide portion 225 may disposed distal to the drive portion 227. A face 233 of the bore 232 may separate the guide portion 225 from the drive portion 227. The face 233 may be disposed on a plane that is perpendicular to the axis AX. The face 233 and the flats 229 may merge to form the edges 231. The guide portion 225 may define one or more channels 235 extending parallel to the axis AX. At least one of the channels 235 may be aligned with a corner of two flats 229 of the plurality of flats 229. In some configurations, the channels 235 may extend distally from the edges 231. In other configurations the channels 235 may extend to the distal end of the output drive shaft 222. As the guide portion 225 and channels 235 are distal the drive portion 227, the channels may serve as a visual indication of where the flats 229 are to assist a user in aligning the accessory tool to the flats 229 of the drive portion 227.

The output drive shaft 222 may define a plurality of openings 236 through inner and outer surfaces of the distal portion 226 of the output drive shaft 222 that are configured to receive one or more retainers 240 for coupling the accessory tool. The openings 236 may be slotted. The slotted openings 236 may be disposed about the axis AX such that the slotted openings 236 surround the bore 232 of the distal portion 226 of the output drive shaft 222. The openings 236 may be position proximal of the edges 231.

A lock assembly 238 is coupled to the distal portion 226 of the output drive shaft 222 to removably couple the accessory tools to the surgical attachment 204. The lock assembly 238 may include the one or more retainers 240. The retainers 240 are configured to be at least partially disposed within the bore 232. In many configurations, one or more of the retainers 240 comprise a spherical body. It is contemplated that the retainers 240 may comprise other shapes capable of engaging the accessory tool to couple the accessory tool to the output drive shaft 222. Each retainer 240 may be moveable within one of the slotted openings 236 relative to the output drive shaft 222 in a direction perpendicular to the axis AX. In many configurations, each retainer 240 is also moveable within one of the slotted openings 236 relative to the output drive shaft 222 in a direction parallel to the axis AX. One or more of the slotted openings 236 may be sized to prevent movement of one or more of the retainers 240 to pass through the slotted opening 236. In other words, one or more of the slotted openings 236 may be sized large enough to permit a retainer 240 to extend radially inward beyond the inner surface of the output drive shaft 222, and small enough to prevent a retainer 240 from falling into the bore 232 through the slotted opening 236. The retainers 240 and slotted openings 236 may be disposed about the axis AX such that the retainers 240 and the openings 236 are spaced apart equiangularly about the axis AX.

The lock assembly 238 comprises a collar 242 slidably coupled to the output drive shaft 222. The collar 242 is moveable relative to the output drive shaft 222 to a first position and a second position. The collar 242 in the first position is more distal relative the output drive shaft 222 in the first position than in the second position. The collar 242 may be biased distally to the engaged position by a first biasing mechanism 244. A shim 243 may be secured to the output drive shaft 222 to limit the collar 242 in a distal direction.

The lock assembly 238 may further include a sleeve 256 configured to surround the distal portion 226 of the output drive shaft 222 and to be coupled to and rotate with the distal portion 226 of the output drive shaft 222. The sleeve 256 may include a projection 246 and a recess 248 defined proximal the projection. In many configurations, the projection 246 is an annular projection 246 having an annular tapered surface. In some instances, the annular projection 246 may be tapered such that a diameter of the tapered surface increases proximally.

The lock assembly 238 may further include a slider 258 configured to surround the distal portion 226 of the output drive shaft 222 between the sleeve 256 and the output shaft 222. The slider 258 may have walls that define apertures 260 in communication with the slotted openings 236 of the output drive shaft 222 and is configured to rotate with the output drive shaft 222 by virtue of the retainers 240 being received in both the apertures 260 of the slider 258 and the slotted openings 236 of the output drive shaft 222. The slider 258 is axially displaceable in a proximal direction in response to movement of the collar 242. The slider 258 may be biased distally by a second biasing member 262. When the collar 242 is in the first position, the first biasing member 244 spaces the collar 242 distally further than the slider 258 may be moved such that the collar 242 is spaced from the slider 258 in the first position. The second biasing member urges the slider 258 distally such that the retainers 240 abut the annular projection 246 of the sleeve 256 to move the retainers into the engaged position. When the accessory tool is received within the bore 232 to an adequate depth for coupling, the retainer 240 projects into the bore 232 in an engaged position at a first distance from the axis AX to abut the accessory tool. In the configuration illustrated in FIGS. 10-14, corners of the accessory tool are configured to align with one or more retainers 240. In some configurations, the retainers 240 may also be configured to be received in grooves of the square accessory tool.

When the collar 242 is moved to the second position, the collar 242 abuts the slider 258 to move the slider 258 and the retainers 240 proximally in opposition to the first and second biasing members 244, 262 so that the recess 248 of the sleeve 256 is axially aligned with the retainer 240 to receive the retainer 240 and the accessory tool may be inserted or removed without the retainer 240 preventing axial movement of the square accessory tool. In other words, a user may apply force in opposition to the biasing members 244, 262 to move the collar 242 and the slider 258 to the disengaged position and permit axial movement of the accessory tool within the bore 232.

Separation of the slider 258 and the collar 242 permit the accessory tool to be loaded without moving the collar 242. For example, a user may load the accessory tool and abut the retainers 240 in the engaged position to move the retainers 240 and the slider 258 proximally in opposition to the second biasing member 262 until the accessory tool has been introduced to the appropriate axial position of the output shaft 222 at which point the second biasing member 262 will return the retainers 240 to the engaged position to secure the accessory tool to the output shaft 222. Once secured, manipulation of the collar 242 to disengage the retainer 240 may be required. Spacing the slider 258 from the collar 242 also prevent a user from accidentally disengaging the accessory tool by bumping the collar 242 since the collar 242 must be moved a predetermined axial distance before abutting the slider 258. In other configurations, the collar 242 and the slider 258 may be coupled together.

When the accessory tool is loaded, friction established between the retainers 240, and the accessory tool may make rotation of the accessory tool to reorient the accessory tool while difficult. By positioning the retainers 240 proximal of the edges 231, the user may rotate the accessory tool to align the corresponding flats of the accessory tool with the flats 229 of the drive portion 227 before friction is established between the retainers 240 and the accessory tool.

The axial length of the slotted openings 236 limit the axial movement of the retainer 240 and slider 258 relative to the output drive shaft 222 between the engaged and disengaged positions. The slotted openings 236 also cooperate with the tapered surface of the annular projection 246 to allow for varying sized accessory tool diameters. The varying sized may be a result of manufacturing tolerances of the accessory tools or different types or versions of the accessory tools.

Advantages with combining the lock assembly 138, 238 with the gear assembly 110, 210 include reducing the complexity of the design and reducing the overall size of the system 100.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

What is claimed is:

1. A surgical attachment for coupling to a surgical driver and a surgical accessory tool, the surgical attachment comprising:
    a housing having a first end portion for coupling to the surgical driver and a second end portion opposite the first end portion;
    a driving member at least partially disposed within the housing, the driving member being rotatable about an axis relative to the housing and configured to transfer torque received from the surgical driver to the surgical accessory tool, the driving member comprising a drive portion having a plurality of shoulders defining a bore at a distal end of the drive portion and a plurality of flats further defining the bore and extending proximally from each of the plurality of shoulders for engaging corresponding flats of the surgical accessory tool; and
    a lock assembly coupled to the driving member comprising,
    a retainer positioned proximal the plurality of shoulders of the drive portion of the driving member, the retainer moveable in a direction perpendicular to the axis,
    a collar slidably coupled to the driving member and moveable relative to the driving member from a first position to a second position,
    wherein the retainer is in an engaged position in which the retainer is disposed at a first distance from the axis when the collar is in the first position for coupling the surgical accessory tool to the driving member, and
    wherein the retainer is permitted to move to a released position in which the retainer is disposed at a second distance from the axis greater than the first distance when the collar is in the second position for decoupling the surgical accessory tool from the driving member.

2. The surgical attachment of claim 1, wherein the drive portion defines an opening to receive the retainer.

3. The surgical attachment of claim 2, wherein the opening is positioned at a corner of two flats of the plurality of flats.

4. The surgical attachment of claim 2, wherein the opening is slotted to permit the retainer to move in a direction parallel to the axis.

5. The surgical attachment of claim 1, wherein the driving member further comprises a guide portion disposed distal to the drive portion, the guide portion defining one or more channels extending parallel to the axis.

6. The surgical attachment of claim 5, wherein at least one of the one or more channels is aligned with a corner of two flats of the plurality of flats.

7. The surgical attachment of claim 5, wherein at least one of the one or more channels extends to a distal end of the driving member.

8. The surgical attachment of claim 5, wherein at least one of the one or more channels extends distally from the plurality of shoulders.

9. The surgical attachment of claim 1, further comprising a sleeve coupled to and rotatable with the driving member, the sleeve comprising a projection extending inwardly toward the driving member to engage the retainer.

10. The surgical attachment of claim 9, wherein the projection comprises an annular projection.

11. The surgical attachment of claim 9, wherein an inner surface of the projection is tapered.

12. The surgical attachment of claim 9, wherein the lock assembly further comprises a slider disposed between the sleeve and the driving member, the slider having walls to define an aperture to receive the retainer and move the retainer axially relative to the sleeve and driving member, wherein the slider is moveable relative to the driving member along the axis in response to abutting engagement with the collar.

13. The surgical attachment of claim 12, wherein the lock assembly further comprises a first biasing member to urge the slider distally to bring the retainer into abutting engagement with the projection of the sleeve.

14. The surgical attachment of claim 13, wherein the lock assembly further comprises a second biasing member to urge the collar distally to the first position, and wherein the collar is moveable into abutting engagement with the slider in opposition to the first and second biasing members to move the slider and the retainer proximally relative to the sleeve and the driving member to move the retainer to the released position.

15. The surgical attachment of claim 13, wherein the collar is spaced from the slider in the first position.

16. The surgical attachment of claim 1, wherein the retainer comprises a spherical body.

17. The surgical attachment of claim 1, wherein the lock assembly comprises a plurality of retainers including the retainer, wherein each of the plurality of retainers are equiangularly spaced about the axis.

18. A surgical handpiece system for coupling to a surgical accessory tool, the surgical handpiece system comprising:
   a surgical handpiece including a motor for generating torque; and
   a surgical attachment configured to be removably attached to the surgical handpiece, the surgical attachment comprising,
   a housing having a first end portion for coupling to the surgical handpiece and a second end portion opposite the first end portion,
   a driving member at least partially disposed within the housing, the driving member being rotatable about an axis relative to the housing and configured to transfer torque received from the surgical handpiece to the surgical accessory tool, the driving member comprising a drive portion having a plurality of edges defining a bore at a distal end of the drive portion and a plurality of flats further defining the bore and extending proximally from each of the plurality of edges for engaging corresponding flats of the surgical accessory tool, and
   a lock assembly coupled to the driving member comprising,
   a retainer positioned proximal the plurality of edges of the drive portion of the driving member, the retainer moveable in a direction perpendicular to the axis,
   a collar slidably coupled to the driving member and moveable relative to the driving member from a first position to a second position,
   wherein the retainer is in an engaged position in which the retainer is disposed at a first distance from the axis when the collar is in the first position for coupling the surgical accessory tool to the driving member, and
   wherein the retainer is permitted to move to a released position in which the retainer is disposed at a second distance from the axis greater than the first distance when the collar is in the second position for decoupling the surgical accessory tool from the driving member.

19. The surgical handpiece system of claim 18, wherein the surgical attachment further comprises a sleeve coupled to and rotatable with the driving member, the sleeve comprising a projection extending inwardly toward the driving member to engage the retainer.

20. The surgical handpiece system of claim 19, wherein the lock assembly of the surgical attachment further comprises a slider disposed between the sleeve and the driving member, the slider having walls to define an aperture to receive the retainer and move the retainer axially relative to the sleeve and driving member, wherein the slider is moveable relative to the driving member along the axis in response to abutting engagement with the collar.

* * * * *